US012677166B2

(12) United States Patent
Fu et al.

(10) Patent No.: US 12,677,166 B2
(45) Date of Patent: Jul. 7, 2026

(54) CAPABILITY CALLING METHOD AND DEVICE, NETWORK NODE AND STORAGE MEDIUM

(71) Applicants: China Mobile Communication Co., Ltd Research Institute, Beijing (CN); China Mobile Communications Group Co., Ltd., Beijing (CN)

(72) Inventors: Yuexia Fu, Beijing (CN); Xiaohui Shi, Beijing (CN); Hanyu Ding, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 355 days.

(21) Appl. No.: 18/261,887

(22) PCT Filed: Jan. 20, 2022

(86) PCT No.: PCT/CN2022/072993
§ 371 (c)(1),
(2) Date: Jul. 18, 2023

(87) PCT Pub. No.: WO2022/156745
PCT Pub. Date: Jul. 28, 2022

(65) Prior Publication Data
US 2024/0306009 A1 Sep. 12, 2024

(30) Foreign Application Priority Data
Jan. 20, 2021 (CN) ......................... 202110076181.6

(51) Int. Cl.
*H04W 24/02* (2009.01)
*H04W 16/18* (2009.01)
(Continued)

(52) U.S. Cl.
CPC ........... *H04W 24/02* (2013.01); *H04W 16/18* (2013.01); *H04W 60/00* (2013.01); *H04L 63/205* (2013.01); *H04L 69/24* (2013.01)

(58) Field of Classification Search
CPC ..... H04W 24/00; H04W 24/02; H04W 16/00; H04W 16/18; H04W 60/00; H04W 74/00;
(Continued)

(56) References Cited

U.S. PATENT DOCUMENTS

2007/0195709 A1* 8/2007 He ........................ H04L 43/08
370/252
2012/0059836 A1* 3/2012 Jin ..................... H04L 67/1001
707/E17.014
(Continued)

FOREIGN PATENT DOCUMENTS

CN 112203290 A 6/2000
CN 106804033 * 6/2017 .............. H04W 8/02
(Continued)

OTHER PUBLICATIONS

China Mobile Communications Corporation, "Proposal to update the requirements of capability exposure function in edge computing", International Telecommunication Union, Telecommunication Standardization Sector, Study Period 2017-2020, 18419-C70 (201207), Study Group 13, E-Meeting, 2020-12-7/17.
(Continued)

*Primary Examiner* — Warner Wong
(74) *Attorney, Agent, or Firm* — Price Heneveld LLP

(57) ABSTRACT
A capability calling method, a capability calling device, a network node and a storage medium are provided. The capability calling method includes classifying, by a first network node, a capability classification corresponding to a first capability on each of at least two second network nodes in accordance with at least one parameter.

12 Claims, 3 Drawing Sheets

(51) Int. Cl.
    *H04W 60/00*           (2009.01)
    *H04L 9/40*            (2022.01)
    *H04L 69/24*           (2022.01)

(58) Field of Classification Search
    CPC ... H04L 65/1073; H04L 63/205; H04L 67/50;
                 H04L 69/24; H04L 12/2856; H04L
                                        2012/6424
    See application file for complete search history.

(56)                  References Cited

U.S. PATENT DOCUMENTS

| | | | | |
|---|---|---|---|---|
| 2014/0095630 A1* | 4/2014 | Wohlert | ................. | H04W 4/08 |
| | | | | 709/206 |
| 2017/0026269 A1* | 1/2017 | Liang | ..................... | H04L 43/18 |
| 2020/0084202 A1 | 3/2020 | Smith et al. | | |

| | | | | |
|---|---|---|---|---|
| 2020/0358673 A1 | 11/2020 | Ren et al. | | |
| 2021/0274340 A1* | 9/2021 | Sun | ....................... | H04W 48/20 |
| 2022/0150678 A1* | 5/2022 | Zhang | ................... | H04L 47/283 |
| 2023/0049810 A1* | 2/2023 | Zhang | ................ | H04W 12/069 |

FOREIGN PATENT DOCUMENTS

| | | | | |
|---|---|---|---|---|
| CN | 108540549 A | 9/2018 | | |
| CN | 111726381 A | 9/2020 | | |
| WO | WO-2022111787 A1 * | 6/2022 | .......... | H04W 56/001 |

OTHER PUBLICATIONS

Tencent, FS_EMSA: Discovery of Edge Processing Capabilities Requirements, 3GPP TSG SA WG4#109-e meeting, Tdoc S4-200750, May 20-Jun. 3, 2020.

* cited by examiner classifying a capability classification corresponding to a first capability on each of at least two second network nodes in accordance with at least one parameter

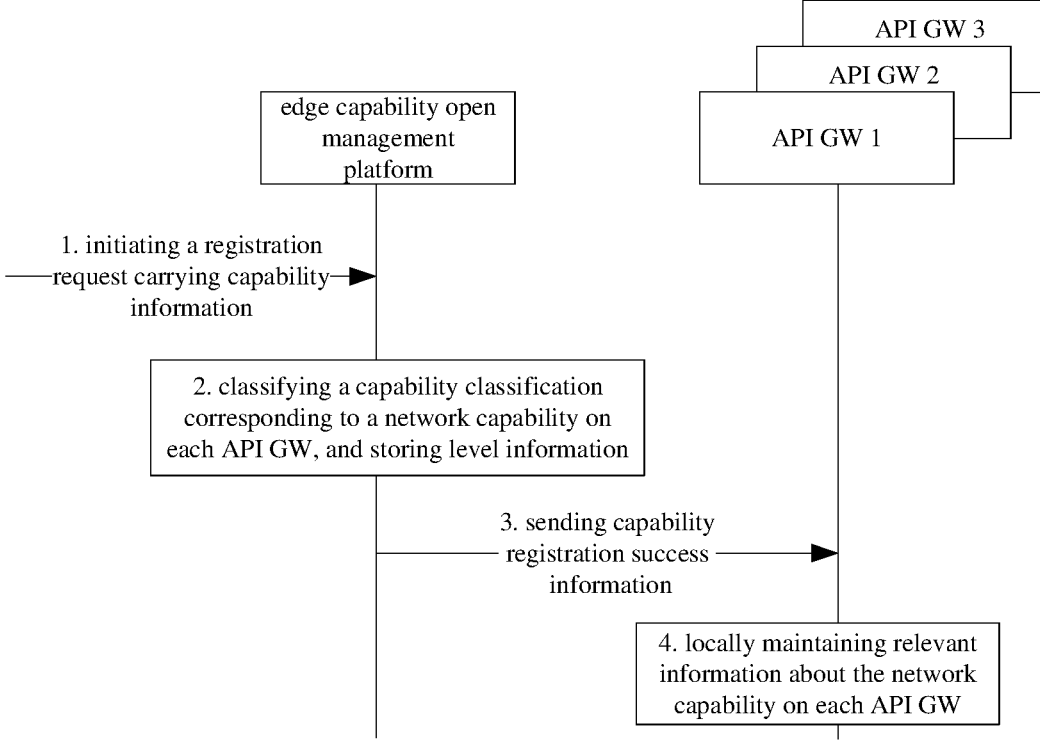

Fig. 2 receiving first information sent by a first network node

301 classifying a capability classification corresponding to the first capability in accordance with the first information

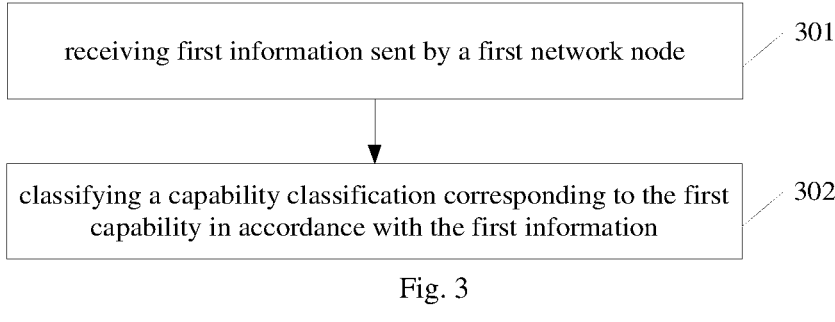

ordering a first capability corresponding to a first capability classification to a first network node

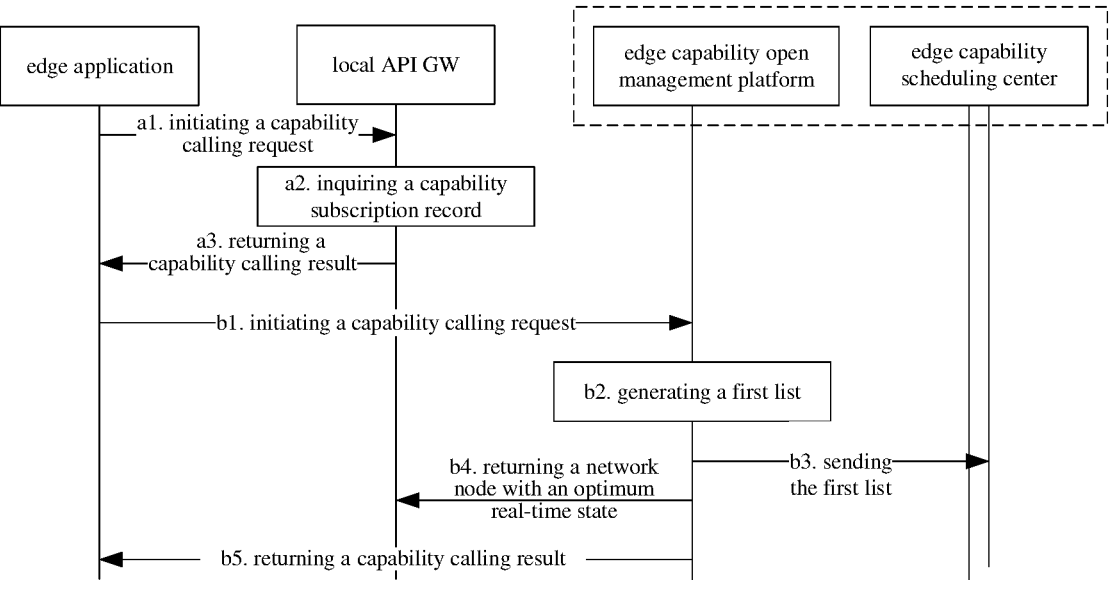
Fig. 5
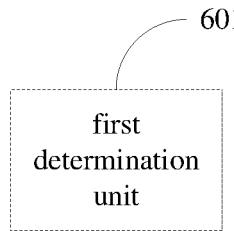
601
first
determination
unit
Fig. 6
702          701
second
determination
unit
first reception
unit
Fig. 7
801
ordering unit
Fig. 8

CAPABILITY CALLING METHOD AND DEVICE, NETWORK NODE AND STORAGE MEDIUM

CROSS-REFERENCE TO RELATED APPLICATION

This application is the U.S. national phase of PCT Application No. PCT/CN2022/072993 filed on Jan. 20, 2022, which claims a priority of the Chinese patent application No. 202110076181.6 filed on Jan. 20, 2021, both of which are incorporated herein by reference in their entireties.

TECHNICAL FIELD

The present application relates to the field of network technology, in particular to a capability calling method, a capability calling device, a network node and a storage medium.

BACKGROUND

Along with the development and deployment of edge computing, more and more network capabilities are deployed at a network edge, e.g., wireless positioning capability, user identification, bandwidth management capability, Radio Network Information Service (RNIS), flow-splitting capability, cloud game and video encoding/decoding, and these network capabilities have been gradually used by an application of an operator or a third-party application. When a network capability is to be used by an application, a capability ordering request needs to be submitted to a management platform, and the network capability cannot be called until the ordering is completed.

In the related art, there is a problem that the called network capability does not match a service requirement of the application.

SUMMARY

An object of the present application is to provide a capability calling method, a capability calling device, a network node and a storage medium, so as to solve the problem in the related art.

The present application provides the following technical solutions.

In one aspect, the present application provides in some embodiments a capability calling method for a first network node, including classifying a capability classification corresponding to a first capability on each of at least two second network nodes in accordance with at least one parameter.

In an embodiment of the present application, in the case that the first capability is a network capability, the at least one parameter includes at least one of a network distance between a corresponding second network node and a wireless side, an access capacity of the corresponding second network node with respect to the first capability, a response delay of the corresponding second network node with respect to the first capability, or performance of the first capability deployed on the corresponding second network node.

In an embodiment of the present application, the determining, in accordance with the at least one parameter, the capability classification corresponding to the first capability on each of the at least two second network nodes includes, when registering the first capability, determining, in accordance with the at least one parameter, the capability classification corresponding to the first capability on each of the at least two second network nodes.

In an embodiment of the present application, the capability calling method further includes sending first information to a third network node and each of the at least two second network nodes, the first information is used to indicate the capability classification corresponding to the first capability on each of the at least two second network nodes, and the third network node is a network node for ordering and calling the first capability.

In an embodiment of the present application, the capability calling method further includes storing second information and sending the second information to each of the at least two second network nodes, and the second information is used to indicate a network capability ordered by a third network node and a capability classification corresponding to the ordered network capability.

In an embodiment of the present application, the capability calling method further includes: receiving a first request sent by a third network node, the first request being used to request to call the first capability: in the case that the first capability corresponding to a first capability classification is determined to be ordered by the third network node, generating a first list, the first list including at least one of the at least two second network nodes, and the first capability classification being a capability classification corresponding to the first capability on the second network node in the first list; and sending third information to the third network node in accordance with the first list, the third information being used to indicate one second network node in the first list, to enable the third network node to send the first request to the second network node indicated by the third information.

In an embodiment of the present application, the generating the first list includes generating the first list in accordance with a distance between the second network node and the third network node.

In an embodiment of the present application, the capability calling method further includes determining the third information in accordance with at least one real-time performance parameter of each second network node in the first list, and the at least one real-time performance parameter includes at least one of an occupancy rate, a response delay, or an upstream rate or downstream rate.

In another aspect, the present application provides in some embodiments a capability calling method for any of at least two second network nodes, a first capability being deployed on each of the at least two second network nodes, the capability calling method including: receiving first information sent by a first network node; and determining a capability classification corresponding to the first capability in accordance with the first information. The first information is used to indicate the capability classification corresponding to the first capability on each of the at least two second network nodes, and the capability classification is classified by the first network node in accordance with at least one parameter.

In an embodiment of the present application, the capability calling method further includes: receiving a first request sent by a third network node, the first request being used to request to call the first capability; and calling the first capability corresponding to a first capability classification for the third network node in accordance with the first request. The first request is sent by the third network node in the case of determining that the first capability with the first capability classification has been deployed on the second network node.

In an embodiment of the present application, the capability calling method further includes receiving second information sent by the first network node, the second information is used to indicate a network capability ordered by the third network node and a capability classification corresponding to the ordered network capability, and the calling the first capability corresponding to the first capability classification for the third network node in accordance with the first request includes, in the case that the first capability corresponding to the first capability classification is determined through the second information to be ordered by the third network node, calling the first capability corresponding to the first capability classification for the third network node in accordance with the first request.

In yet another aspect, the present application provides in some embodiments a capability calling method for a third network node, including ordering a first capability corresponding to a first capability classification to a first network node. The first capability is deployed on at least two second network nodes, and a capability classification corresponding to the first capability on each of the at least two second network nodes is classified by the first network node in accordance with at least one parameter.

In an embodiment of the present application, the capability calling method further includes: receiving first information sent by the first network node, the first information being used to indicate the capability classification corresponding to the first capability on each of the at least two second network nodes; and sending a first request to a corresponding network node in accordance with the first information, the first request being used to request to call the first capability.

In an embodiment of the present application, the sending the first request to the corresponding network node in accordance with the first information includes: in the case that the first information indicates that the first capability corresponding to the first capability classification is deployed on a fourth network node, sending the first request to the fourth network node, the fourth network node being a network node to which the third network node accesses; and in the case that the first information indicates that the first capability corresponding to the first capability classification is not deployed on the fourth network node, sending the first request to the first network node, receiving third information sent by the first network node, and sending the first request to the second network node indicated by the third information. The third information is used to indicate one second network node in a first list, the first list includes at least one of the at least two second network nodes, and a capability classification corresponding to the first capability on the second network node in the first list matches the first capability classification.

In still yet another aspect, the present application provides in some embodiments a capability calling device, including a first determination unit configured to classify, in accordance with at least one parameter, a capability classification corresponding to a first capability on each of at least two second network nodes.

In still yet another aspect, the present application provides in some embodiments a capability calling device, including: a first reception unit configured to receive first information sent by a first network node; and a second determination unit configured to determine a capability classification corresponding to the first capability in accordance with the first information. A first capability is deployed on each of at least two second network nodes, and the first information is used to indicate the capability classification corresponding to the first capability on each of the at least two second network nodes, and the capability classification is classified by the first network node in accordance with at least one parameter.

In still yet another aspect, the present application provides in some embodiments a capability calling device, including an ordering unit configured to order a first capability corresponding to a first capability classification to a first network node. The first capability is deployed on at least two second network nodes, and a capability classification corresponding to the first capability on each of the at least two second network nodes is classified by the first network node in accordance with at least one parameter.

In still yet another aspect, the present application provides in some embodiments a first network node, including a first processor and a first communication interface. The first processor is configured to classify, in accordance with at least one parameter, a capability classification corresponding to a first capability on each of at least two second network nodes.

In still yet another aspect, the present application provides in some embodiments a second network node, including a second processor and a second communication interface. The second communication interface is configured to receive first information sent by a first network node, and the second processor is configured to determine a capability classification corresponding to the first capability in accordance with the first information. A first capability is deployed on each of at least two second network nodes, and the first information is used to indicate the capability classification corresponding to the first capability on each of the at least two second network nodes, and the capability classification is classified by the first network node in accordance with at least one parameter.

In still yet another aspect, the present application provides in some embodiments a third network node, including a third processor and a third communication interface. The third communication interface is configured to order a first capability corresponding to a first capability classification to a first network node. The first capability is deployed on at least two second network nodes, and a capability classification corresponding to the first capability on each of the at least two second network nodes is classified by the first network node in accordance with at least one parameter.

In still yet another aspect, the present application provides in some embodiments a first network node, including a first processor and a first memory storing therein a computer program. The first processor is configured to execute the computer program to implement the above-mentioned method at the first network node.

In still yet another aspect, the present application provides in some embodiments a second network node, including a second processor and a second memory storing therein a computer program. The second processor is configured to execute the computer program to implement the above-mentioned method at the second network node.

In still yet another aspect, the present application provides in some embodiments a third network node, including a third processor and a third memory storing therein a computer program. The third processor is configured to execute the computer program to implement the above-mentioned method at the third network node.

In still yet another aspect, the present application provides in some embodiments a storage medium storing therein a computer program. The computer program is used to be executed by a processor to implement the above-mentioned method.

According to the network capability calling method, the network capability calling method, the network node and the storage medium in the embodiments of the present application, the first capability is deployed on the at least two second nodes, the first network node determines, in accordance with at least one parameter, the capability classification corresponding to the first capability on each of the at least two second network nodes, and the third network node orders and calls the first capability corresponding to the first capability classification in accordance with the capability classification corresponding to the first capability. As a result, it is able to order and call the capability in a diversified manner, thereby to enable the called capability to match a service requirement of an application.

BRIEF DESCRIPTION OF THE DRAWINGS

FIG. 1 is a flow chart of a capability calling method according to an embodiment of the present application;

FIG. 2 is a schematic view showing the registration procedure of a network capability according to an embodiment of the present application:

FIG. 3 is another flow chart of the capability calling method according to an embodiment of the present application:

FIG. 4 is yet another flow chart of the capability calling method according to an embodiment of the present application:

FIG. 5 is a schematic view showing a calling procedure of the network capability according to an embodiment of the present application:

FIG. 6 is a schematic view showing a capability calling device according to an embodiment of the present application:

FIG. 7 is another schematic view showing the capability calling device according to an embodiment of the present application:

FIG. 8 is yet another schematic view showing the capability calling device according to an embodiment of the present application:

DETAILED DESCRIPTION

Figure 9:
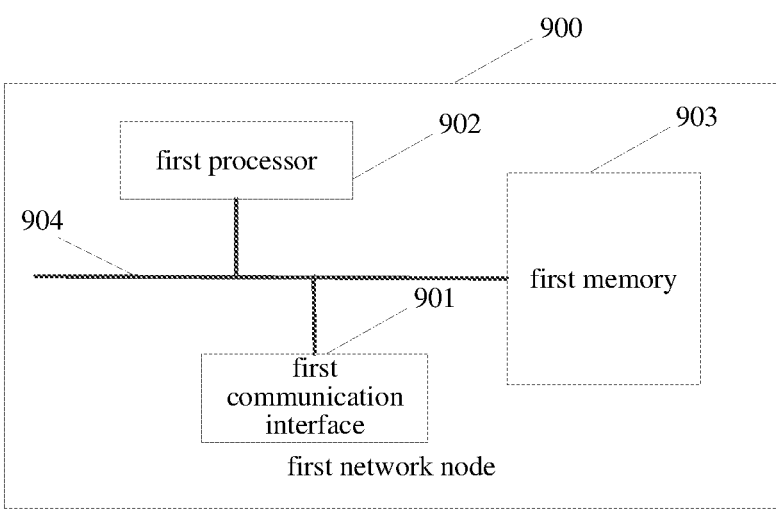
FIG. 9 is a schematic view showing a first network node according to an embodiment of the present application.

When an application needs to use a network capability, an application server submits a capability ordering request to a management platform, and the network capability is called after the capability ordering request is granted. Along with the development and deployment of edge computing, more and more network capabilities are deployed at a network edge. In the related art, with respect to the network capability deployed at the network edge, on one hand, different applications have different service requirements on a same network capability, but an operator fails to consider how to perform the performance evaluation on the network capability and provide capability classifications for different service requirements based on the evaluation. On the other hand, when the network capability is provided for the application, usually proximate matching is performed in accordance with a distance between the application server and a position where the network capability is deployed. In addition when the application server is switched, the proximate matching is also performed, without considering whether the called network capability meets the service requirement on the application. In a word, in the related art, there is a problem that the called network capability does not match the service requirement of the application.

Based on the above, the present application provides a capability calling method, a capability calling device, a network node and a storage medium. A first capability is deployed on at least two second nodes, a first network node determines a capability classification corresponding to the first capability on each of the at least two second network nodes based on at least one parameter, and a third network node orders and calls the first capability corresponding to the first capability classification in accordance with the capability classification corresponding to the first capability. As a result, it is able to order and call the capability in a diversified manner, thereby to enable the called capability to match a service requirement of an application.

The present application will be described hereinafter in more details in conjunction with the drawings and embodiments. It should be appreciated that, in the embodiments of the present application, a capability may be a network capability deployed by an operator at a network edge, i.e., an edge network capability, or a capability deployed by a third-party application at the network edge, e.g., a face recognition function.

The present application provides in some embodiments a capability calling method for a first network node. Here, the first network node is a management platform, also called as an edge capability management platform or an edge capability open management platform. As shown in FIG. 1, the method includes Step 101 of classifying a capability classification corresponding to a first capability on each of at least two second network nodes in accordance with at least one parameter.

The first capability is deployed on the at least two second network nodes, and a third network node orders and calls the first capability corresponding to a first capability classification.

For example, the first capability is a network capability such as a wireless positioning capability, user identification, a bandwidth management capability, a Radio Network Information Services (RNIS), a flow-splitting capability, a cloud game or video encoding/decoding, or a face recognition function deployed by a third-party application. The second network node is a network node where the first capability is deployed, usually a Multi-access Edge Computing MEC) platform. In actual use, the second network node is an Application Programming Interface (API) Gateway (GW) at a network edge. The first network node, as a capability management platform, determines the capability classification corresponding to the first capability on each second network node, so as to provide the first capability with different capability classifications for different applications. The third network node orders and calls the first capability corresponding to the first capability classification to the first network node in accordance with the capability classification corresponding to the first capability.

In an embodiment of the present application, in the case that the first capability is a network capability, the at least one parameter includes at least one of a position of a corresponding second network node, an access capacity of the corresponding second network node with respect to the first capability, a response delay of the corresponding second network node with respect to the first capability, or performance of the first capability deployed on the corresponding second network node.

The position of the second network node is just a position in a network where the second network node is located, and it is used to indicate a network distance between the second network node and a wireless side. The access capacity and the response delay depend on the second network node itself, e.g., the performance of the API GW or a configured Edge Computing Platform (ECP) resource. The performance of the first capability depends on the performance of the first capability deployed on the second network node. For example, for the wireless positioning capability, different positioning accuracy is required on different second network nodes. The first network node determines the capability classification corresponding to the first capability on each second network node in accordance with the at least one parameter.

In actual use, a capability classification function is newly added in the first network node, and when a capability is to be registered in the management platform, a capability classification of the capability is determined and stored by the first network node.

In an embodiment of the present application, the determining, in accordance with the at least one parameter, the capability classification corresponding to the first capability on each of the at least two second network nodes includes, when registering the first capability, determining, in accordance with the at least one parameter, the capability classification corresponding to the first capability on each of the at least two second network nodes.

In an embodiment of the present application, the capability calling method further includes sending first information to the third network node and each of the at least two second network nodes, the first information is used to indicate the capability classification corresponding to the first capability on each of the at least two second network nodes, and the third network node is a network node for ordering and calling the first capability.

In this regard, the third network nodes initiates a request to a corresponding network node in accordance with the first information so as to call the first capability, and the second network node determines the capability classification corresponding to the first capability deployed locally at the second network node in accordance with the first information.

As shown in FIG. 2, a network capability registration procedure includes the following steps.

Step 1: initiating a registration request carrying capability information to the edge capability open management platform (i.e., the first network node), so as to request to register a corresponding network capability.

Step 2: classifying, by the edge capability open management platform, a capability classification corresponding to the network capability on each deployed API GW (i.e., second network node) in accordance with at least one parameter, and storing, by the edge capability open management platform, the level information.

Here, the edge capability open management platform stores level information about the network capability, apart from registration information about the network capability, i.e., a capability identifier.

Step 3: sending, by the edge capability open management platform, capability registration success information carrying the level information to each API GW.

Step 4: locally maintaining, by each API GW, relevant information about the network capability in accordance with the level information, the relevant information including level information corresponding to the network capability locally deployed on each API GW.

Table 1 shows the level information stored in the first network node. As shown in Table 1, a network capability 1 corresponding to a first level is deployed on both an API GW 1 and an API GW 2. In addition, a network capability 2 corresponding to a second level is further deployed on the API GW 1.

TABLE 1

| Capability identifier | Deployment position | Level information |
|---|---|---|
| Capability 1 | API GW1 | First level |
| Capability 1 | API GW2 | First level |
| Capability 2 | API GW1 | Second level |

Table 2 shows the level information stored in the API GW 1, and the level information is determined by the API GW 1 in accordance with the first information sent by the management platform. The level information is related to the network capabilities deployed on the API GW 1, including the network capability 1 corresponding to the first capability classification and the network capability 2 corresponding to the second capability classification deployed on the API GW 1. In addition, a specific deployment path of each network capability on the API GW 1 is recorded at a corresponding deployment position.

TABLE 2

| Capability identifier | Deployment position | Level information |
|---|---|---|
| Capability 1 | API GW 1.xx | First level |
| Capability 2 | API GW 2.xxx | Second level |

After determining the capability classifications of the first capability, the third network node may specifically order a capability classification of the first capability. In addition, when storing a capability ordering record of the third network node, the first network node needs to store the capability classification ordered by the third network node besides the capability ordered by the third network node, and send the capability ordering record to each second network node, so that the third network node conveniently calls the capability subsequently.

Based on the above, in an embodiment of the present application, the method further includes storing second information and sending the second information to each of the at least two second network nodes, and the second information is used to indicate a network capability ordered by a third network node and a capability classification corresponding to the ordered network capability.

Here, when the first network node or any second network node has received the request for calling the first capability from the third network node, it determines that the third network node has ordered the first capability in accordance with the second information, further determines the capability classification corresponding to the first capability ordered by the third network node in accordance with the second information, and then calls the first capability corresponding to the capability classification for the third network node.

Table 3 shows the second information sent by the first network node. As shown in Table 3, the capability 1 corresponding to the capability classification 1 is ordered by an application 1 and an application 2.

TABLE 3

| Application information | Capability ordering information |
|---|---|
| Application 1 | Capability 1-first level |
| Application 2 | Capability 1-first level |

In an embodiment of the present application, the method further includes: receiving a first request from the third network node, the first request being used to request to call the first capability: in the case that the first capability corresponding to a first capability classification is determined to be ordered by the third network node, generating a first list, the first list including at least one of the at least two second network nodes, and the first capability classification being a capability classification corresponding to the first capability on the second network node in the first list; and sending third information to the third network node in accordance with the first list, the third information being used to indicate one second network node in the first list, to enable the third network node to send the first request to the second network node indicated by the third information.

When the third network node calls the first capability, at first whether the first capability corresponding to the first capability classification is locally deployed, i.e., whether the first capability corresponding to the first capability classification is deployed on an API GW to which the third network node as an application server accesses, is determined based on the first information sent by the first network node. When the first information indicates that the first capability corresponding to the first capability classification fails to be locally deployed, the third network node sends the first request to the first network node. After determining that the first capability corresponding to the first capability classification is determined to be ordered by the third network node in accordance with the second information, the first network node determines the second network node where the first capability corresponding to the first capability classification is deployed in accordance with the first information, and then generates the first list in accordance with the determined second network node.

In an embodiment of the present application, the generating the first list includes generating the first list in accordance with a distance between the second network node and the third network node.

In actual use, when generating the first list, the first network node needs to consider the distance between the second network node and the third network node, so as to ensure as possible that the distance between the third network node and the second network node in the first list is within an appropriate range, thereby to call the first capability more rapidly.

In an embodiment of the present application, the capability calling method further includes determining the third information in accordance with at least one real-time performance parameter of each second network node in the first list, and the at least one real-time performance parameter includes at least one of an occupancy rate, a response delay, or an upstream rate or downstream rate.

Here, when the second network node in the first list is selected for the third network node, real-time state information about the second network node is considered. In the case that each first capability being provided corresponds to the first capability classification, the second network node in an optimum real-time state is selected, so that the selected second network node provides the optimum first capability for the third network node.

In actual use, a corresponding functional module is deployed on the first network node, so as to achieve a function of an edge scheduling center, receive the first list from the management platform, obtain the real-time state of each second network node in the first list, and sends the obtained real-time state to the management platform.

The present application further provides in some embodiments a capability calling method for any second network nodes in at least two second network nodes. A first capability is deployed on each of the at least two second network nodes. As shown in FIG. 3, the capability calling method includes: Step 301 of receiving first information sent by a first network node; and Step 302 of determining a capability classification corresponding to the first capability in accordance with the first information. The first information is used to indicate the capability classification corresponding to the first capability on each of the at least two second network nodes, and the capability classification is classified by the first network node in accordance with at least one parameter.

Here, the second network node may be each API GW at a network edge. The first network node, as a capability management platform, determines the capability classification corresponding to the first capability on each second network node. The second network node receives the first information sent by the first network node, and determines therefrom the capability classification corresponding to the first capability deployed locally at the second network node. Based on the determined capability classification, the first capability corresponding to different capability classifications is provided for different applications. The third network node, i.e., an application server, orders and calls the first capability corresponding to the first capability classification to the first network node in accordance with the capability classification corresponding to the first capability when ordering the first capability to the first network node.

In an embodiment of the present application, the method further includes: receiving a first request sent by a third network node, the first request being used to request to call the first capability; and calling the first capability corresponding to a first capability classification for the third network node in accordance with the first request. The first request is sent by the third network node in the case of determining that the first capability with the first capability classification has been deployed on the second network node.

In actual use, in the case that the third network node determines that the first capability corresponding to the first capability classification is deployed on the second network node, the third network node sends the first request to the second network node, so as to call the first capability corresponding to the first capability classification in accordance with the first request. Here, the second network node which has received the first request is a network node to which the third network node accesses, or any other second network node.

In an embodiment of the present application, the method further includes receiving second information sent by the first network node, the second information is used to indicate a network capability ordered by the third network node and a capability classification corresponding to the ordered network capability. The calling the first capability corresponding to the first capability classification for the third network node in accordance with the first request includes, in the case that the first capability corresponding to the first capability classification is determined through the second information to be ordered by the third network node, calling the first capability corresponding to the first capability classification for the third network node in accordance with the first request.

Upon the receipt of the first request from the third network node, the second network node calls the first capability corresponding to the first capability classification for the third network node in accordance with the first request after the second network node determines that the first capability corresponding to the first capability classification is determined to be ordered by the third network node in accordance with the second information.

The present application further provides in some embodiments a capability calling method for a third network node. In actual use, the third network node is an application server. As shown in FIG. 4, the method includes Step 401 of ordering a first capability corresponding to a first capability classification to a first network node. The first capability is deployed on at least two second network nodes, and a capability classification corresponding to the first capability on each of the at least two second network nodes is classified by the first network node in accordance with at least one parameter.

For example, the first capability is a network capability such as a wireless positioning capability, user identification, a bandwidth management capability, an RNIS, a flow-splitting capability, a cloud game or video encoding/decoding, or a face recognition function deployed by a third-party application. The second network node is a network node where the first capability is deployed, usually an MEC platform. In actual use, the second network node is an API GW at a network edge. The first network node, as a capability management platform, determines the capability classification corresponding to the first capability on each second network node, so as to provide the first capability with different capability classifications for different applications. The third network node, i.e., an application server, orders and calls the first capability corresponding to the first capability classification to the first network node in accordance with the capability classification corresponding to the first capability.

In an embodiment of the present application, the method further includes: receiving first information sent by the first network node, the first information being used to indicate the capability classification corresponding to the first capability on each of the at least two second network nodes; and sending a first request to a corresponding network node in accordance with the first information, the first request being used to request to call the first capability.

When the third network node calls the first capability, at first whether the first capability corresponding to the first capability classification is locally deployed, i.e., whether the first capability corresponding to the first capability classification is deployed on an API GW to which the third network node as an application server accesses, is determined based on the first information sent by the first network node. When the first information indicates that the first capability corresponding to the first capability classification fails to be locally deployed, the third network node sends the first request to the first network node. After determining that the first capability with the first capability classification is determined to be ordered by the third network node in accordance with the second information, the first network node determines the second network node where the first capability corresponding to the first capability classification is deployed in accordance with the first information, and then generates a first list in accordance with the determined second network node.

Based on the above, in an embodiment of the present application, the sending the first request to the corresponding network node in accordance with the first information includes: in the case that the first information indicates that the first capability corresponding to the first capability classification is deployed on a fourth network node, sending the first request to the fourth network node, the fourth network node being a network node which accesses to a same local area network as the third network device; and in the case that the first information indicates that the first capability corresponding to the first capability classification is not deployed on the fourth network node, sending the first request to the first network node, receiving third information sent by the first network node, and sending the first request to the second network node indicated by the third information. The third information is used to indicate one second network node in the first list, the first list includes at least one of the at least two second network nodes, and a capability classification corresponding to the first capability on the second network node in the first list matches the first capability classification.

In actual use, when generating the first list, the first network node needs to consider the distance between the second network node and the third network node, so as to ensure as possible that the distance between the third network node and the second network node in the first list is within an appropriate range, thereby to call the first capability more rapidly. In addition, when the second network node in the first list is selected for the third network node, real-time state information about the second network node is considered. In the case that the first capability being provided corresponds the first capability classification, the second network node in an optimum real-time state is selected, so that the selected second network node provides the optimum first capability for the third network node.

As shown in FIG. 5, a network capability calling procedure includes the following steps.

At first, in the case that the first network capability with the first capability classification is deployed on a local API GW of an edge application (e.g., the third network node), the following steps a1 to a3 are performed.

Step a1: initiating, by the edge application, a capability calling request to the local API GW.

Step a2: inquiring, by the local API GW, a capability ordering record, so as to determine that the first network capability with the first capability classification is ordered by the edge application.

Step a3: sending, by the local API GW, a capability calling result to the edge application.

Next, in the case that the first network capability with the first capability classification is not deployed on the local API GW of the edge application (e.g., the third network node), the following steps b1 to b5 are performed.

Step b1: initiating, by the edge application, a capability calling request to an edge capability open management platform (i.e., the first network node).

Step b2: generating, by the edge capability open management platform, a first list that meets a condition in accordance with the capability ordering record and a position of the edge application.

Step b3: sending, by the edge capability open management platform, the first list to an edge capability scheduling center.

Step b4: sending, by the edge capability scheduling center, a network node with an optimum real-time state to the edge capability management platform in accordance with the first list and a real-time state of each network node in the first list.

The edge capability scheduling center inquires the real-time state to each MEC platform in real time, so as to determine the real-time state of each network node.

Step b5: sending, by the edge capability management platform, a capability calling result to the edge application.

According to the embodiments of the present application, the first network node determines the capability classification corresponding to the first capability on each of the at least two second network nodes in accordance with the at least one parameter, and the third network node orders and calls the first capability corresponding to the first capability classification in accordance with the capability classification corresponding to the first capability. As a result, it is able to order and call the capability in a diversified manner, thereby to enable the called capability to match a service requirement of an application. In addition, based on the above-mentioned capability calling method, after the application server is switched, it is still able to call the capability meeting the service requirement for the application in accordance with the capability classification corresponding to the capability ordered by the application, thereby to achieve the service assurance in a precise manner.

In order to implement the above-mentioned method, the present application further provides in some embodiments a capability calling device for a first network node. As shown in FIG. 6, the device includes a first determination unit 601 configured to classify, in accordance with at least one parameter, a capability classification corresponding to a first capability on each of at least two second network nodes.

In an embodiment of the present application, in the case that the first capability is a network capability, the at least one parameter includes at least one of a position of a corresponding second network node, an access capacity of the corresponding second network node with respect to the first capability, a response delay of the corresponding second network node with respect to the first capability, or performance of the first capability deployed on the corresponding second network node.

In an embodiment of the present application, the first determination unit 601 is specifically configured to, when registering the first capability, determine the capability classification corresponding to the first capability on each of the at least two second network nodes in accordance with the at least one parameter.

In an embodiment of the present application, the device further includes a first sending unit configured to send first information to a third network node and each of the at least two second network nodes, the first information is used to indicate the capability classification corresponding to the first capability on each of the at least two second network nodes, and the third network node is a network node for ordering and calling the first capability.

In an embodiment of the present application, the device further includes a second sending unit configured to store second information and send the second information to each of the at least two second network nodes, and the second information is used to indicate a network capability ordered by a third network node and a capability classification corresponding to the ordered network capability.

In an embodiment of the present application, the device further includes: a second reception unit configured to receive a first request sent by a third network node, the first request being used to request to call the first capability: a generation unit configured to, in the case that the first capability corresponding to a first capability classification is determined to be ordered by the third network node, generate a first list, the first list including at least one of the at least two second network nodes, and the first capability classification being a capability classification corresponding to the first capability on the second network node in the first list; and a third sending unit configured to send third information to the third network node in accordance with the first list, the third information being used to indicate one second network node in the first list, to enable the third network node to send the first request to the second network node indicated by the third information.

In an embodiment of the present application, the generation unit is specifically configured to generate the first list in accordance with a distance between the second network node and the third network node.

In an embodiment of the present application, the device further includes a third determination unit configured to determine the third information in accordance with at least one real-time performance parameter of each second network node in the first list, and the at least one real-time performance parameter includes at least one of an occupancy rate, a response delay, or an upstream rate or downstream rate.

In actual use, the first determination unit 601, the generation unit and the third determination unit may be implemented through a processor in the capability calling device, and the first sending unit, the second sending unit, the second reception unit and the third sending unit may be implemented through a communication interface in the capability calling device.

In order to implement the above-mentioned method for the second network node, the present application further provides in some embodiments a capability calling device for a second network node. As shown in FIG. 7, the device includes: a first reception unit 701 configured to receive first information sent by a first network node; and a second determination unit 702 configured to determine a capability classification corresponding to the first capability in accordance with the first information. A first capability is deployed on each of at least two second network nodes, and the first information is used to indicate the capability classification corresponding to the first capability on each of the at least two second network nodes, and the capability classification is classified by the first network node in accordance with at least one parameter.

In an embodiment of the present application, the device further includes: a third reception unit configured to receive a first request sent by a third network node, the first request being used to request to call the first capability; and a calling unit configured to call the first capability corresponding to a first capability classification for the third network node in accordance with the first request. The first request is sent by the third network node in the case of determining that the first capability with the first capability classification has been deployed on the second network node.

In an embodiment of the present application, the device further includes a fourth reception unit configured to receive second information sent by the first network node, and the second information is used to indicate a network capability ordered by the third network node and a capability classification corresponding to the ordered network capability. The calling unit is specifically configured to, in the case that the first capability corresponding to the first capability classification is determined through the second information to be ordered by the third network node, call the first capability corresponding to the first capability classification for the third network node in accordance with the first request.

In actual use, the first reception unit 701, the third reception unit and the fourth reception unit may be implemented through a communication interface in the capability calling device, the second determination unit 702 may be implemented through a processor in the capability calling device, and the calling unit may be implemented through the processor in combination with the communication interface in the capability calling device.

In order to implement the above-mentioned method for the third network node, the present application further provides in some embodiments a capability calling device for a third network node. As shown in FIG. 8, the device includes an ordering unit 801 configured to order a first capability corresponding to a first capability classification to a first network node. The first capability is deployed on at least two second network nodes, and a capability classification corresponding to the first capability on each of the at least two second network nodes is classified by the first network node in accordance with at least one parameter.

In an embodiment of the present application, the device further includes: a fifth reception unit configured to receive first information sent by the first network node, the first information being used to indicate the capability classification corresponding to the first capability on each of the at least two second network nodes; and a fourth sending unit configured to send a first request to a corresponding network node in accordance with the first information, the first request being used to request to call the first capability.

In an embodiment of the present application, the fourth sending unit is specifically configured to: in the case that the first information indicates that the first capability corresponding to the first capability classification is deployed on a fourth network node, send the first request to the fourth network node, the fourth network node being a network node to which the third network node accesses; and in the case that the first information indicates that the first capability corresponding to the first capability classification is not deployed on the fourth network node, send the first request to the first network node, receive third information sent by the first network node, and send the first request to the second network node indicated by the third information. The third information is used to indicate one second network node in a first list, the first list includes at least one of the at least two second network nodes, and a capability classification corresponding to the first capability on the second network node in the first list matches the first capability classification.

In actual use, the ordering unit 801, the fifth reception unit and the fourth sending unit are implemented through a communication interface in the capability calling device.

It should be appreciated that, the above program modules are for illustrative purposes only when the capability is called by the capability calling device. In actual use, the steps are completed by different program modules according to the practical needs, i.e., the device includes different program modules to implement all of, or a part of, the above-mentioned steps. In addition, the capability calling device and the capability calling method belong to a same inventive concept, and the implementation of the capability calling device may refer to that of the capability calling method, which will thus not be repeatedly defined herein.

Based on hardware implementation of the program modules and in order to implement the above-mentioned method for the first network node, the present application further provides in some embodiments a first network node 900 which, as shown in FIG. 9, includes: a first communication interface 901 configured to exchange information with the other network node; and a first processor 902 connected to the first communication interface 901 so as to exchange the information with the other network node. The first processor is configured to execute a computer program, to implement the above-mentioned method for the first network node. The computer program is stored in a first memory 903.

To be specific, the first processor 902 is configured to classify, in accordance with at least one parameter, a capability classification corresponding to a first capability on each of at least two second network nodes.

In an embodiment of the present application, in the case that the first capability is a network capability, the at least one parameter includes at least one of a position of a corresponding second network node, an access capacity of the corresponding second network node with respect to the first capability, a response delay of the corresponding second network node with respect to the first capability, or performance of the first capability deployed on the corresponding second network node.

In an embodiment of the present application, the first processor 902 is specifically configured to, when registering the first capability, determine the capability classification corresponding to the first capability on each of the at least two second network nodes in accordance with the at least one parameter.

In an embodiment of the present application, the first communication interface 901 is configured to send first information to a third network node and each of the at least two second network nodes, the first information is used to indicate the capability classification corresponding to the first capability on each of the at least two second network nodes, and the third network node is a network node for ordering and calling the first capability.

In an embodiment of the present application, the first processor 902 is configured to store second information. The first communication interface 901 is configured to send the second information to each of the at least two second network nodes, and the second information is used to indicate a network capability ordered by a third network node and a capability classification corresponding to the ordered network capability.

In an embodiment of the present application, the first communication interface 901 is configured to receive a first request sent by a third network node, and the first request is used to request to call the first capability. The first processor 902 is further configured to, in the case that the first capability corresponding to a first capability classification is determined to be ordered by the third network node, generate a first list, the first list includes at least one of the at least two second network nodes, and the first capability classification is a capability classification corresponding to the first capability on the second network node in the first list. The first communication interface 901 is further configured to send third information to the third network node in accordance with the first list, and the third information is used to indicate one second network node in the first list, to enable the third network node to send the first request to the second network node indicated by the third information.

In an embodiment of the present application, the first processor 902 is specifically configured to generate the first list in accordance with a distance between the second network node and the third network node.

In an embodiment of the present application, the first processor 902 is further configured to determine the third information in accordance with at least one real-time performance parameter of each second network node in the first list, and the at least one real-time performance parameter includes at least one of an occupancy rate, a response delay, or an upstream rate or downstream rate.

It should be appreciated that, specific processing procedures of the first processor 902 and the first communication interface 901 may refer to those mentioned hereinabove.

In actual use, the components of the first network node 900 may be connected together through a bus system 904. It should be appreciated that, the bus system 904 is configured to achieve connection and communication among the components. Apart from a data bus, the bus system 904 may further include a power source bus, a control bus and a state signal bus. For clarification, all these buses in FIG. 9 may be collectively called as bus system 904.

In the embodiments of the present application, the first memory 903 is configured to store therein various data, so as to support operations of the first network node 900. For example, the data includes any computer program used to be executed by the first network node 900.

The above-mentioned method may be applied to, or implemented by, the first processor 902. The first processor 902 may be an integrated circuit (IC) having a signal processing capability. During the implementation, the steps of the above-mentioned method may be completed through an integrated logic circuit of hardware in the processor 902 or instructions in the form of software. The first processor 902 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present application. The general purpose processor may be a microprocessor or any other conventional processor. The steps of the method disclosed in the embodiments of the present application may be directly implemented by a hardware decoding processor, or implemented by a combination of hardware and software modules in the decoding processor. The software module may be located in a storage medium, and the storage medium is located in the first memory 903, and the first processor 902 reads information in the first memory 903, and implements the steps of the foregoing method in combination with its hardware.

In the embodiments of the present application, the first network node 900 may be implemented through one or more of ASCI, DSP, Programmable Logic Device (PLD), Complex Programmable Logic Device (CPLD), FPGA, general-purpose processor, controller, Micro Controller Unit (MCU), microprocessor or any other electronic element, to implement the above-mentioned method.

Figure 10:
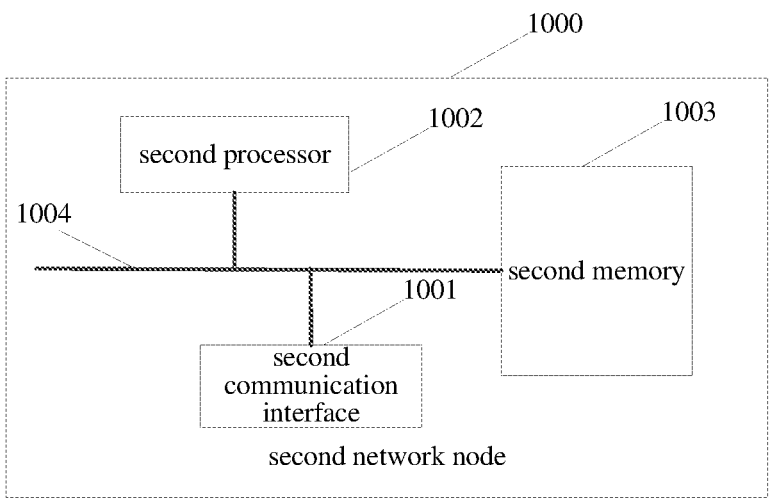
FIG. 10 is a schematic view showing a second network node according to an embodiment of the present application.

Based on the hardware implementation of the program modules and in order to implement the method for the second network node, the present application further provides in some embodiments a second network node 1000 which, as shown in FIG. 10, includes: a second communication interface 1001 configured to exchange information with the other network node; and a second processor 1002 connected to the second communication interface 1001 so as to exchange the information with the other network node. The second processor is configured to execute a computer program, to implement the above-mentioned method for the second network node. The computer program is stored in a second memory 1003.

To be specific, the second communication interface 1001 is configured to receive first information sent by a first network node, and the second processor is configured to determine a capability classification corresponding to the first capability in accordance with the first information. A first capability is deployed on each of at least two second network nodes, and the first information is used to indicate the capability classification corresponding to the first capability on each of the at least two second network nodes, and the capability classification is classified by the first network node in accordance with at least one parameter.

In an embodiment of the present application, the second communication interface 1001 is further configured to: receive a first request sent by a third network node, the first request being used to request to call the first capability; and call the first capability corresponding to a first capability classification for the third network node in accordance with the first request. The first request is sent by the third network node in the case of determining that the first capability with the first capability classification has been deployed on the second network node.

In an embodiment of the present application, the second communication interface 1001 is further configured to: receive second information sent by the first network node, the second information being used to indicate a network capability ordered by the third network node and a capability classification corresponding to the ordered network capability; and in the case that the first capability corresponding to the first capability classification is determined through the second information to be ordered by the third network node, call the first capability corresponding to the first capability classification for the third network node in accordance with the first request.

It should be appreciated that, specific processing procedures of the second processor 1002 and the second communication interface 1001 may refer to those mentioned hereinabove.

In actual use, the components of the second network node 1000 may be connected together through a bus system 1004. It should be appreciated that, the bus system 1004 is configured to achieve connection and communication among the components. Apart from a data bus, the bus system 1004 may further include a power source bus, a control bus and a state signal bus. For clarification, all these buses in FIG. 10 may be collectively called as bus system 1004.

In the embodiments of the present application, the second memory 1003 is configured to store therein various data, so as to support operations of the second network node 1000. For example, the data includes any computer program executed by the second network node 1000.

The above-mentioned method may be applied to, or implemented by, the second processor 1002. The second processor 1002 may be an IC having a signal processing capability. During the implementation, the steps of the above-mentioned method may be completed through an integrated logic circuit of hardware in the second processor 1002 or instructions in the form of software. The second processor 1002 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present application. The general purpose processor may be a microprocessor or any other conventional processor. The steps of the method disclosed in the embodiments of the present application may be directly implemented by a hardware decoding processor, or implemented by a combination of hardware and software modules in the decoding processor. The software module may be located in a storage medium, and the storage medium is located in the second storage 1003, and the second processor 1002 reads information in the second storage 1003, and implements the steps of the foregoing method in combination with its hardware.

In the embodiments of the present application, the second network node 1000 may be implemented through one or more of ASCI, DSP, PLD, CPLD, FPGA, general-purpose processor, controller, MCU, microprocessor or any other electronic element, to implement the above-mentioned method.

Figure 11:
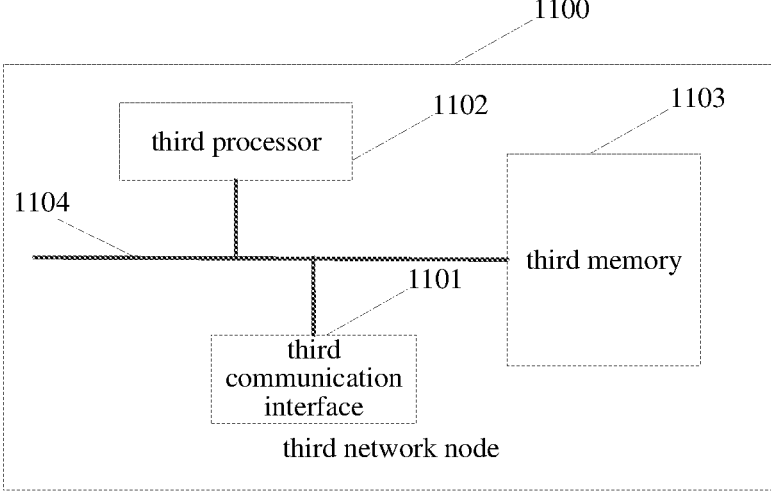
FIG. 11 is a schematic view showing a third network node according to an embodiment of the present application.

Based on hardware implementation of the program modules and in order to implement the above-mentioned method for the third network node, the present application further provides in some embodiments a third network node 1100 which, as shown in FIG. 11, includes: a third communication interface 1101 configured to exchange information with the other network node; and a third processor 1102 connected to the third communication interface 1101 so as to exchange the information with the other network node. The first processor is configured to execute a computer program, to implement the above-mentioned method for the third network node. The computer program is stored in a third memory 1103.

To be specific, the third communication interface 1101 is configured to order a first capability corresponding to a first capability classification to a first network node. The first capability is deployed on at least two second network nodes, and a capability classification corresponding to the first capability on each of the at least two second network nodes is classified by the first network node in accordance with at least one parameter.

In an embodiment of the present application, the third communication interface 1101 is further configured to: receive first information sent by the first network node, the first information being used to indicate the capability classification corresponding to the first capability on each of the at least two second network nodes; and send a first request to a corresponding network node in accordance with the first information, the first request being used to request to call the first capability.

In an embodiment of the present application, the third communication interface 1101 is further configured to: in the case that the first information indicates that the first capability corresponding to the first capability classification is deployed on a fourth network node, send the first request to the fourth network node, the fourth network node being a network node to which the third network node accesses; and in the case that the first information indicates that the first capability corresponding to the first capability classification is not deployed on the fourth network node, send the first request to the first network node, receiving third information sent by the first network node, and sending the first request to the second network node indicated in the third information. The third information is used to indicate one second network node in a first list, the first list includes at least one of the at least two second network nodes, and a capability classification corresponding to the first capability on the second network node in the first list matches the first capability classification.

In actual use, the components of the third network node 1100 may be connected together through a bus system 1104. It should be appreciated that, the bus system 1104 is configured to achieve connection and communication among the components. Apart from a data bus, the bus system 1104 may further include a power source bus, a control bus and a state signal bus. For clarification, all these buses in FIG. 11 may be collectively called as bus system 1104.

In the embodiments of the present application, the third memory 1103 is configured to store therein various data, so as to support operations of the third network node 1100. For example, the data includes any computer program executed by the third network node 1100.

The above-mentioned method may be applied to, or implemented by, the third processor 1102. The third processor 1102 may be an IC having a signal processing capability. During the implementation, the steps of the above-mentioned method may be completed through an integrated logic circuit of hardware in the third processor 1102 or instructions in the form of software. The third processor 1102 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present application. The general purpose processor may be a microprocessor or any other conventional processor. The steps of the method disclosed in the embodiments of the present application may be directly implemented by a hardware decoding processor, or implemented by a combination of hardware and software modules in the decoding processor. The software module may be located in a storage medium, and the storage medium is located in the third storage 1103, and the third processor 1102 reads information in the third storage 1103, and implements the steps of the foregoing method in combination with its hardware.

In the embodiments of the present application, the third network node 1100 may be implemented through one or more of ASCI, DSP, PLD, CPLD, FPGA, general-purpose processor, controller, MCU, microprocessor or any other electronic element, to implement the above-mentioned method.

It should be appreciated that, the memory in the embodiments of the present application (the first memory 903, the second memory 1003 or the third memory 1103) may include a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM), a Ferromagnetic RAM (FRAM), a flash memory, a magnetic surface memory, an optical disk, or a Compact Disc Read-Only Memory (CD-ROM). The magnetic surface memory may be a magnetic disk memory or a magnetic tape memory. The volatile memory may be a random access memory (Random Access Memory, RAM) which serves as an external high-speed cache. Illustratively but not restrictively, the RAM may include static RAM (Static RAM, SRAM), Synchronous Static Random Access Memory (SSRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory intends to include, but not limited to, the above-mentioned and any other appropriate memories.

The present application further provides in some embodiments a storage medium, i.e., a computer storage medium, especially a computer-readable storage medium. For example, the storage medium includes the first memory 903 storing therein a computer program, and the computer program is executed by the first processor 902 of the first network node 900 to implement the steps of the above-mentioned method for the first network node. For another example, the storage medium includes the second memory 1003 storing therein a computer program, and the computer program is executed by the second processor 1002 of the second network node 1000 to implement the steps of the above-mentioned method for the second network node. For yet another example, the storage medium includes the third memory 1103 storing therein a computer program, and the computer program is executed by the third processor 1102 of the third network node 1100 to implement the steps of the above-mentioned method for the third network node. The computer-readable storage medium may be an FRAM, an ROM, a PROM, an EPROM, an EEPROM, a flash memory, a magnetic surface memory, an optical disk, or a CD-ROM.

It should be appreciated that, such words as "first" and "second" are merely used to differentiate different objects rather than to represent any specific order.

In addition, the technical solutions in the embodiments of the present application may be combined arbitrarily if there is no conflict.

The above are only preferred embodiments of the present application, and are not intended to limit the protection scope of the present application.

What is claimed is:

1. A capability calling method for a first network node, comprising:
    classifying, in accordance with at least one parameter, a capability classification corresponding to a first capability on each of at least two second network nodes;
    wherein in the case that the first capability is a network capability, the at least one parameter comprises at least one of:
    a network distance between a corresponding second network node and a wireless side;
    an access capacity of the corresponding second network node with respect to the first capability;
    a response delay of the corresponding second network node with respect to the first capability; or
    performance of the first capability deployed on the corresponding second network node;
    wherein the capability calling method further comprises:
    receiving a first request sent by a third network node, the first request being used to request to call the first capability;
    in the case that the first capability corresponding to a first capability classification is determined to be ordered by the third network node, generating a first list; the first list comprising at least one of the at least two second network nodes, and the first capability classification being a capability classification corresponding to the first capability on the second network node in the first list;
    sending third information to the third network node in accordance with the first list, the third information being used to indicate one second network node in the first list, to enable the third network node to initiate the first request to the second network node indicated by the third information.

2. The capability calling method according to claim 1, wherein the classifying, in accordance with the at least one parameter, the capability classification corresponding to the first capability on each of the at least two second network nodes comprises:
    when registering the first capability, classifying, in accordance with the at least one parameter, the capability classification corresponding to the first capability on each of the at least two second network nodes.

3. The capability calling method according to claim 1, further comprising:
    sending first information to a third network node and each of the at least two second network nodes,
    wherein the first information is used to indicate the capability classification corresponding to the first capability on each of the at least two second network nodes, and the third network node is a network node for ordering and calling the first capability.

4. The capability calling method according to claim 1, further comprising:
    storing second information, and sending the second information to each of the at least two second network nodes,
    wherein the second information is used to indicate a network capability ordered by a third network node and a capability classification corresponding to the ordered network capability.

5. The capability calling method according to claim 1, wherein the generating the first list comprises:
    generating the first list in accordance with a distance between the second network node and the third network node.

6. The capability calling method according to claim 1, further comprising:
    determining the third information in accordance with at least one real-time performance parameter of each second network node in the first list,
    wherein the at least one real-time performance parameter comprises at least one of:
    an occupancy rate;
    a response delay; or
    an upstream rate or downstream rate.

7. A first network node, comprising a first processor and a first memory storing therein a computer program,
    wherein the first processor is configured to execute the computer program to implement the capability calling method according to claim 1.

8. A capability calling method for any second network node in at least two second network nodes, a first capability being deployed on each of the at least two second network nodes, the capability calling method comprising:
    receiving first information sent by a first network node;
    determining a capability classification corresponding to the first capability in accordance with the first information,
    wherein the first information is used to indicate the capability classification corresponding to the first capability on each of the at least two second network nodes, and the capability classification is classified by the first network node in accordance with at least one parameter;
    wherein in the case that the first capability is a network capability, the at least one parameter comprises at least one of:
    a network distance between a corresponding second network node and a wireless side;
    an access capacity of the corresponding second network node with respect to the first capability;

a response delay of the corresponding second network node with respect to the first capability; or performance of the first capability deployed on the corresponding second network node;

wherein the capability calling method further comprises:

receiving a first request sent by a third network node, the first request being used to request to call the first capability;

calling the first capability corresponding to a first capability classification for the third network node in accordance with the first request, wherein the first request is sent by the third network node in the case of determining that the first capability with the first capability classification has been deployed on the second network node.

9. The capability calling method according to claim 8, further comprising:

receiving second information sent by the first network node, the second information being used to indicate a network capability ordered by the third network node and a capability classification corresponding to the ordered network capability, wherein the calling the first capability corresponding to the first capability classification for the third network node in accordance with the first request comprises:

in the case that the first capability corresponding to the first capability classification is determined through the second information to be ordered by the third network node, calling the first capability corresponding to the first capability classification for the third network node in accordance with the first request.

10. A second network node, comprising a second processor and a second memory storing therein a computer program, wherein the second processor is configured to execute the computer program to implement the capability calling method according to claim 8.

11. A capability calling method for a third network node, comprising:

ordering a first capability corresponding to a first capability classification to a first network node, wherein the first capability is deployed on at least two second network nodes, and a capability classification corresponding to the first capability on each of the at least two second network nodes is classified by the first network node in accordance with at least one parameter;

wherein in the case that the first capability is a network capability, the at least one parameter comprises at least one of:

a network distance between a corresponding second network node and a wireless side;

an access capacity of the corresponding second network node with respect to the first capability;

a response delay of the corresponding second network node with respect to the first capability; or performance of the first capability deployed on the corresponding second network node;

wherein the capability calling method further comprises:

receiving first information sent by the first network node, the first information being used to indicate the capability classification corresponding to the first capability on each of the at least two second network nodes;

sending a first request to a corresponding network node in accordance with the first information, the first request being used to request to call the first capability;

wherein the sending the first request to the corresponding network node in accordance with the first information comprises:

in the case that the first information indicates that the first capability corresponding to the first capability classification is deployed on a fourth network node, sending the first request to the fourth network node, the fourth network node being a network node to which the third network node accesses;

in the case that the first information indicates that the first capability corresponding to the first capability classification is not deployed on the fourth network node, sending the first request to the first network node, receiving third information sent by the first network node, and sending the first request to the second network node indicated by the third information, wherein the third information is used to indicate one second network node in a first list, the first list comprises at least one of the at least two second network nodes, and a capability classification corresponding to the first capability on the second network node in the first list matches the first capability classification.

12. A third network node, comprising a third processor and a third memory storing therein a computer program, wherein the third processor is configured to execute the computer program to implement the capability calling method according to claim 11.

* * * * *